United States Patent
Barkan (10) Patent No.: US 8,488,699 B2
(45) Date of Patent: *Jul. 16, 2013

(54) SYNCHRONOUS NETWORK DEVICE

(75) Inventor: Ozdal Barkan, Mountain View, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 13/215,149

(22) Filed: Aug. 22, 2011

(65) Prior Publication Data

US 2011/0299641 A1    Dec. 8, 2011

Related U.S. Application Data

(63) Continuation of application No. 12/052,371, filed on Mar. 20, 2008, now Pat. No. 8,005,178.

(60) Provisional application No. 60/895,861, filed on Mar. 20, 2007.

(51) Int. Cl.
*H04K 1/10*    (2006.01)

(52) U.S. Cl.
USPC ........... 375/260; 370/254; 370/376; 370/503; 375/356; 709/208; 709/248

(58) Field of Classification Search
USPC ........................ 375/260, 356; 709/208, 248
See application file for complete search history.

(56) References Cited

U.S. PATENT DOCUMENTS

| | | | |
|---|---|---|---|
| 6,985,550 B2 * | 1/2006 | Blake | 375/356 |
| 7,602,811 B2 * | 10/2009 | Porter et al. | 370/503 |
| 2002/0186716 A1 * | 12/2002 | Eidson | 370/503 |
| 2003/0154285 A1 * | 8/2003 | Berglund et al. | 709/227 |
| 2003/0165115 A1 | 9/2003 | Sutoh et al. | |
| 2004/0246996 A1 * | 12/2004 | Engel | 370/508 |
| 2008/0219391 A1 | 9/2008 | Moubarak | |
| 2009/0016475 A1 | 1/2009 | Rischar et al. | |

FOREIGN PATENT DOCUMENTS

| | | |
|---|---|---|
| JP | 2002540725 | 11/2002 |
| WO | WO 0059161 | 10/2000 |
| WO | WO-0059161 A1 | 10/2000 |

OTHER PUBLICATIONS

Chinese Application No. 2008800091427, Text of First Office Action, Jul. 3, 2012, 2 pages.

Japanese Application No. 2009-554568, Summary of Notice of Reasons for Rejection, Aug. 21, 2012, 2 pages.

(Continued)

*Primary Examiner* — Leon-Viet Nguyen (57) ABSTRACT

A physical layer device including a plurality of ports and a clock synchronization module. Each port of the plurality of ports is programmable to receive a grandmaster clock. The clock synchronization module is configured to i) receive the grandmaster clock from a first port of the plurality of ports (wherein the first port has been programmed to receive the grandmaster clock), and ii) clean up the grandmaster clock, wherein cleaning up the grandmaster clock includes one or more of removing jitter from the grandmaster clock, controlling a voltage swing or the grandmaster clock, or establishing fixed edge rates of the grandmaster clock. Other ones of the plurality of ports, not including the first port, are programmed to receive the cleaned up grandmaster clock for use when transmitting data.

11 Claims, 5 Drawing Sheets

OTHER PUBLICATIONS

IEEE Std 802.3—2005 Part 3: Carrier sense multiple access with collision detection (CSMNCD) access method and physical layer specifications—Section Three vol. Section 3, 2005, pp. 1-387, XP002489647 ISBN: 0-7381-4740-0.

Notification of Transmittal of the International Search Report and the Written Opinion of The International Searching Authority, or The Declaration dated Aug. 7, 2008 in reference to PCT/US2008/003648.

ZL30120 SonetISDH/Ethernet Multi-Rate Line Card Synchronizer; Data Sheet; Zarlink Semiconductor; May 2006; 27 pages.

ZLAN-211 Synchronizing Ethernet Networks Using Layer 1 clocks with the ZL30120; Application Note; Zarlink Semiconductor; Jan. 2007; 2 pages.

IEEE P802.1 AS/D2.0; Draft Standard for Local and Metropolitan Area Networks':' Timing and Synchronization for Time-Sensitive Applications in Bridged Local Area Networks; Sponsor LAN/MAN Standards Committee of the IEEE Computer Society; Prepared by the Interworking Task Group of IEEE 802.1; 204 pages; Feb. 22, 2008; IEEE 802.1AS—Timing and Synchronization; pp. 1-6.

International Standard IEC 61588(E):2004; First Edition 2004-2009; IEEE 1588(E)TM 2002; Precision Clock Synchronization Protocol for Network Measurement and Control Systems; Sponsor TC9—Technical Committee on Sensor Technology of the IEEE Instrumentation and Measurement Society; Approved Sep. 12, 2002; IEEE-SA Standards Board;. 158 pages.

IEEE Std 802.3TM-2002 (Revision of IEEE std 802.3, 2000 Edition); IEEE Standard for Information technology-Telecomms & info exchange between systems- Local and metropolitan area networks- Specific requirements; Part 3: Carrier sense multiple access with collision detection (CSMA/CD) access method and physical layer specs; IEEE Computer Society; Sponsored by the LAN/MAN Stds Committee; Mar. 8, 2002; 576 pages; Section 2: Clauses 21-33 and Annexes 22A-32A; pp. 1-582; Section 3: Clauses 34-43 and Annexes 36A-43C; pp. 1-379.

IEEE Std 802.3-2002® (Revision of IEEE Std 802.3® ,2000 Edition); IEEE Standard for Information technology-Telecommunications and information exchange betwwn systems-Local and metropolitan area networks- Specific requirements; Part 3: Carrier sense multiple access with collision detection (CSMA/CD) access method and physical layer specifications; IEEE Computer Society; Sponsored by the LAN/MAN Standards Committee; Mar. 8, 2002; 104 pages.

* cited by examiner

SYNCHRONOUS NETWORK DEVICE

CROSS-REFERENCE TO RELATED APPLICATIONS

This present disclosure is a continuation of U.S. application Ser. No. 12/052,371, filed on Mar. 20, 2008, which claims the benefit of U.S. Provisional Application No. 60/895,861, filed on Mar. 20, 2007.

FIELD

The present disclosure relates to synchronous network devices, and more particularly to synchronizing clocks among multiple ports of synchronous network devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Figure 1:
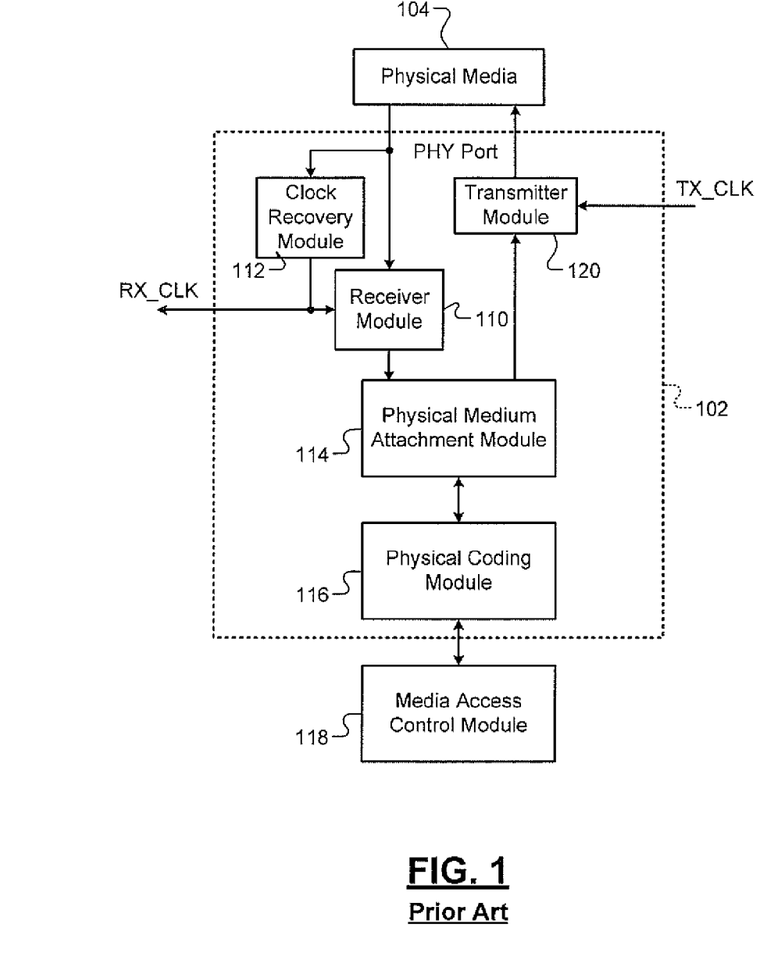
FIG. 1 is a partial functional block diagram of a single port.

Referring now to FIG. 1, a partial functional block diagram of a single port of a network device is shown. A physical layer (PHY) module 102 for the port is connected to a physical media 104. For example, the network device may be an Ethernet device, the physical media 104 may include optical fiber and the PHY module 102 may be 1000BASE-X compliant. In another example, the physical media 104 may include twisted pairs of cable while the PHY module may be 1000BASE-T compliant.

The PHY module 102 includes a receiver module 110 that receives data over the physical media 104. The data received over the physical media 104 includes an embedded clock, which is recovered by a clock recovery module 112. The clock recovery module 112 provides the recovered clock (RX_CLK) to the receiver module 110. RX_CLK is also output from the PHY module 102. The receiver module 110 uses RX_CLK to latch data received over the physical media 104. The latched data is transmitted to a physical medium attachment module 114.

The physical medium attachment module 114 transmits data to and receives data from a physical coding module 116. The physical coding module 116 transmits data to and receives data from a media access control (MAC) module 118 external to the PHY module 102. The PHY module 102 includes a transmitter module 120 that transmits data over the physical media 104 from the physical medium attachment module 114. The transmitter module 120 transmits data using a transmit clock, TX_CLK, received from outside the PHY module 102.

SUMMARY

In general, in one aspect, this specification describes a physical layer device including a plurality of ports and a clock synchronization module. Each port of the plurality of ports is programmable to receive a grandmaster clock. The clock synchronization module is configured to i) receive the grandmaster clock from a first port of the plurality of ports, and ii) clean up the grandmaster clock, wherein cleaning up the grandmaster clock includes one or more of removing jitter from the grandmaster clock, controlling a voltage swing or the grandmaster clock, or establishing fixed edge rates of the grandmaster clock. Other ones of the plurality of ports, not including the first port, are programmed to receive the cleaned up grandmaster clock for use when transmitting data.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

To allow a network device to have the properties of a synchronous network, such as SONET (synchronous optical network), clocks of the devices in the network are synchronized. For example only, the network device may be a wired Ethernet network device. One method of synchronization is to send packets having time stamps. Using determinations of one-way delay and round-trip delay based on the time stamps, devices in the network can synchronize their internal clocks. These time stamps may be used to decrease latency and variability introduced by a protocol stack. Network based delay, such as delay caused by traffic congestion, may affect the accuracy of the timestamps.

Another approach to clock synchronization involves using a recovered clock. In this approach, a single node is chosen as the source of a grandmaster clock. This node may be chosen because of the quality of its clock. For example, a node connected to or receiving time information from an atomic clock may be viewed as the most desirable clock source. This grandmaster clock is then distributed to the other nodes.

When the node having the grandmaster clock source links with another node, the grandmaster clock is used when transmitting data. This grandmaster clock is then recovered by the receiving node. The receiving node adjusts its local clock based thereon and then transmits data to nodes linked with the second node (using the clock adjusted by the grandmaster clock). In this way, the grandmaster clock can be distributed to all the nodes.

A node may have multiple ports. The grandmaster clock may be received on one port and sent on the remaining ports. Each port from which a node transmits the grandmaster clock may be called a synchronous master, while each port receiving the grandmaster clock may be referred to as a synchronous slave. Synchronous master/slave relationships may be established independent of PHY module. For example, synchronous master/slave relationships may be established for twisted pair physical media and optical fiber physical media.

The master/slave relationships may be configured manually by a network administrator. Alternatively, a protocol may be defined where the nodes dynamically determine the node that will be the grandmaster clock source and the tree through which the grandmaster clock source will be distributed. This protocol may be integrated with a protocol such as a spanning tree protocol, which prevents circular loops from being created.

In 1000BASE-T, another form of master/slave relationship is defined. This is defined in clause 40 of IEEE 802.3, the disclosure of which is incorporated herein by reference in its entirety. According to clause 40, two nodes that desire to establish a link must decide which will be the master and which will be the slave. Often, personal computers prefer to be the slave while network switches prefer to be the master.

If both sides prefer the same role, each may pick a random number and a comparison of the random numbers is used to make the assignment. Instead of preferring to be master, one of the nodes may be forced to be master. In this case, the node will become master unless its linked partner is also being forced to be master. When both nodes are being forced to assume the same role, a link may not be established.

The clause 40 master/slave relationship may disagree with the synchronous master/slave relationship. If a protocol is defined to dynamically determine the distribution of the grandmaster clock, the clause 40 master/slave relationships could be assigned to match the synchronous relationships at the same time. The links in the network can then be broken and reestablished, thereby establishing the desired master/slave relationships for both synchronous arrangements and clause 40. Alternatively, the clause 40 master/slave relationships may be manually programmed, such as when the synchronous master/slave relationships are manually programmed.

Figure 2:
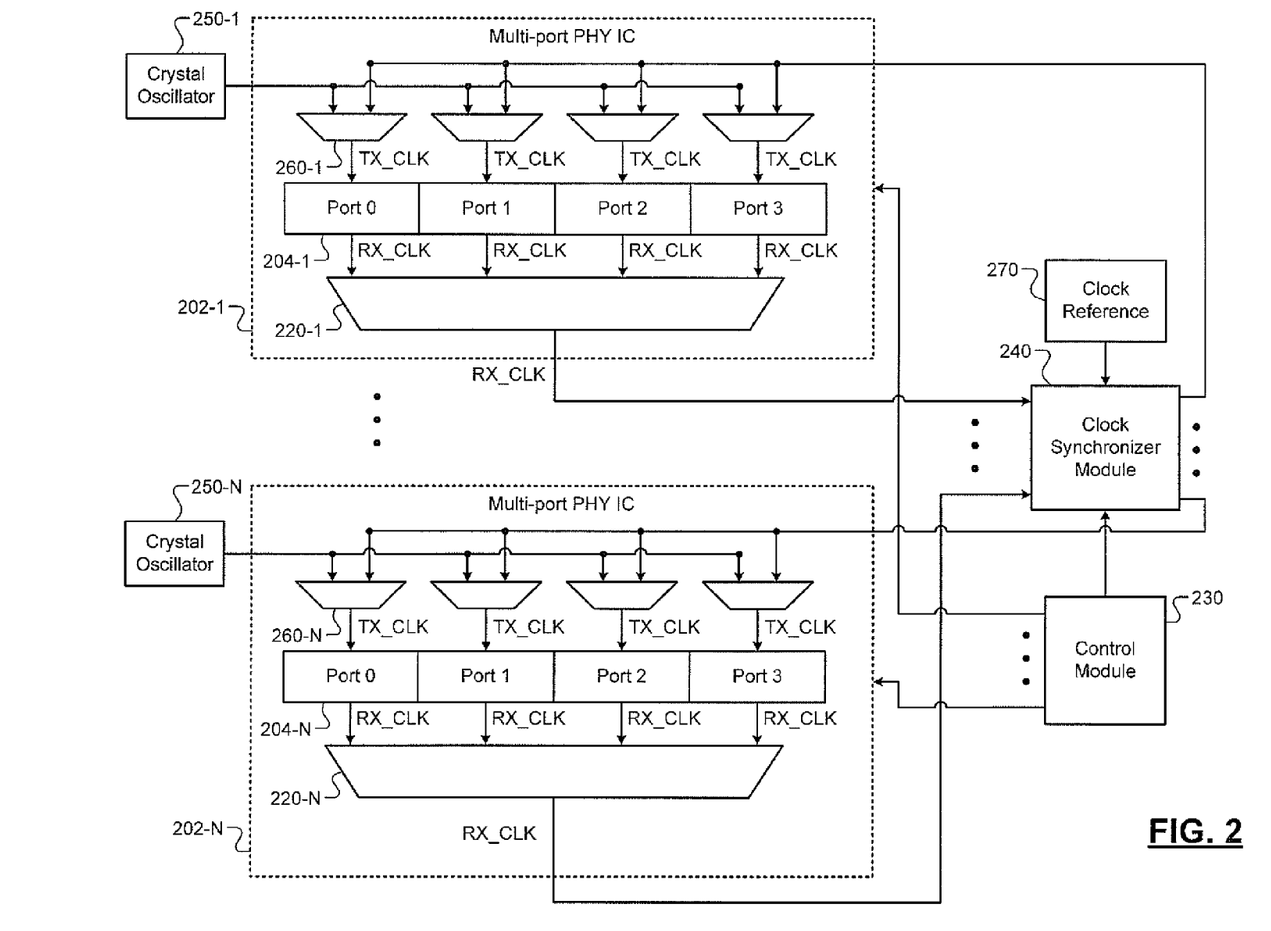
FIG. 2 is a functional block diagram of a multiple port PHY module.

In brief, FIG. 2 shows a group of multipart PHY integrated circuits (ICs) that allow programmatic control of grandmaster clock distribution. Multiple ports, and in the example of FIG. 2, all ports, may be used as the source of the grandmaster clock. The recovered clock from the port that is the source of the grandmaster clock is provided to a clock synchronizer, which cleans up the recovered grandmaster clock. The clock synchronizer may perform such operations as removing jitter, controlling the voltage swing, and establishing fixed edge rates. The improved grandmaster clock may then be provided to all other ports for use in transmission.

Figure 3:
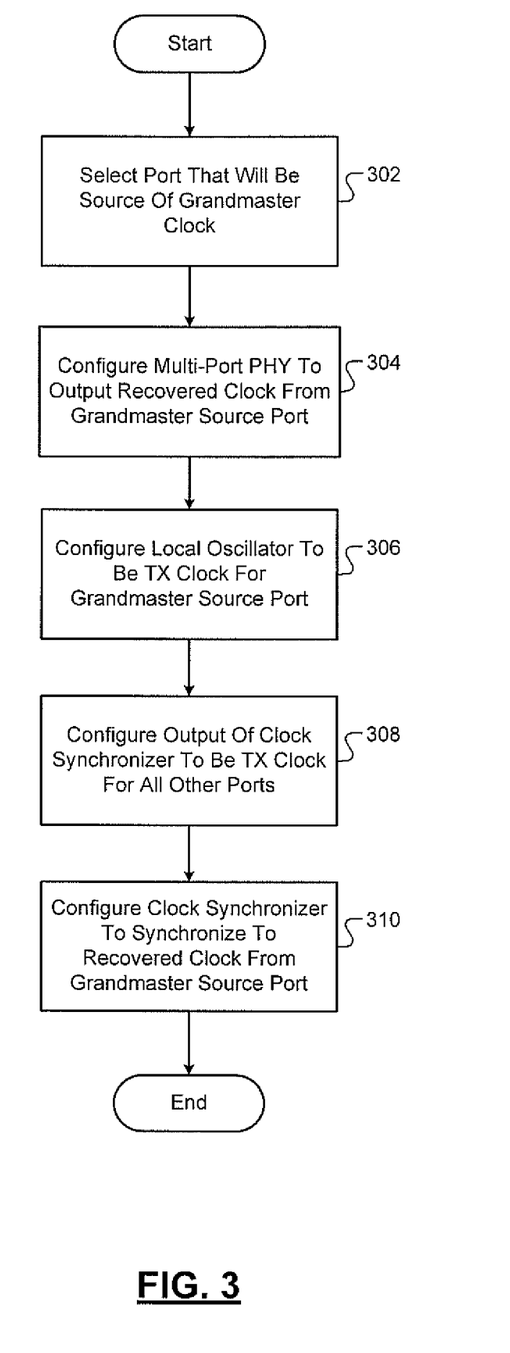
FIG. 3 is a flowchart that depicts exemplary steps performed in controlling the system of FIG. 2.
Figure 4A:
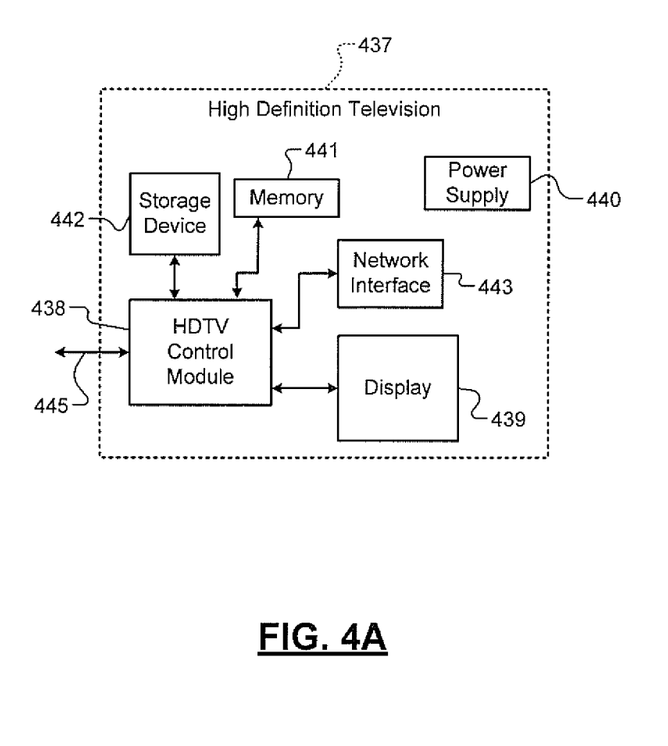
FIG. 4A is a functional block diagram of a high definition television.
Figure 4B:
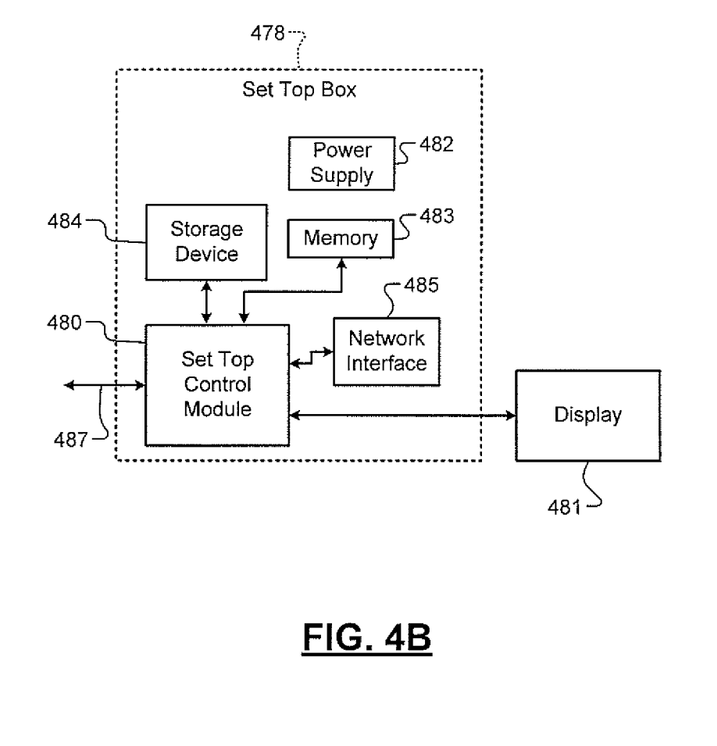
FIG. 4B is a functional block diagram of a set top box.

When these other ports are transmitting using the improved grandmaster clock, their link partners will be receiving the grandmaster clock. The port of a node that is receiving the grandmaster clock may transmit using a local oscillator to prevent a loop from occurring when the recovered clock is passed to the clock synchronizer and back to the same port. FIG. 3 depicts exemplary steps performed in operating the system of FIG. 2, and FIGS. 4A-4B provide exemplary environments where the system of FIG. 2 may be used.

Referring now to FIG. 2, a functional block diagram of a multiple port PHY module is shown. A multi-port PHY IC 202-1 includes multiple PHY ports 204-1. In the example of FIG. 2, the multi-port PHY IC 202-1 includes four PHY ports 204-1.

The RX_CLK from each of the PHY ports 204-1 is received by an output multiplexer 220-1. The output multiplexer 220-1 is controlled by a control module 230. The multiplexer 220-1 selects the RX_CLK from the port within the multi-port PHY IC 202-1 that is receiving the grandmaster clock. This selection may be programmed into the control module 230, such as by setting a value in a control register.

The output multiplexer 220-1 transmits the selected RX_CLK to a clock synchronizer 240. The clock synchronizer 240 cleans up the received clock and transmits the improved clock back to the multi-port PHY IC 202-1. The multi-port PHY IC 202-1 also receives a local oscillator clock. The local oscillator clock may be generated by an external crystal oscillator 250-1. In various implementations, only the crystal is external to the multi-port PHY IC 202-1, while the drive circuitry for the crystal is located within the multi-port PHY IC 202-1. In various other implementations, the local oscillator is located entirely within the multipart PHY IC 202-1.

Each of the PHY ports 204-1 is associated with an input multiplexer 260-1. The input multiplexer 260-1 selects the clock from either the local oscillator or the improved grandmaster clock from the clock synchronizer 240 as the TX_CLK for the port 204-1. These multiplexers 260-1 are also controlled by the control module. If a port 204-1 is designated as the source of the grandmaster clock, the multiplexer 260-1 will select the local oscillator to be the TX_CLK for that port. Otherwise, the TX_CLK will be received from the clock synchronizer 240.

The clock synchronizer 240 may use a stable reference clock from a clock reference 270 to process the selected clock input. The reference clock may be used by a phase locked loop within the clock synchronizer 240. In various implementations, multiple multi-port PHY ICs may be used. In FIG. 2, N multi-port PHY ICs from 202-1 through 202-N are shown. The selected output RX_CLK from the multiplexers 220 is received by the clock synchronizer 240.

The control module 230 indicates to the clock synchronizer 240 which of the multi-port PHY ICs 202 will be the source of the grandmaster clock. The RX_CLK from that multi-port PHY IC 202 will be used by the clock synchronizer 240 to provide the improved clock to each of the multi-port PHY ICs 202. If there are more multi-port PHY ICs 202 than there are inputs to the clock synchronizer 240, an additional multiplexer may be used.

The multiplexers 260 may provide gradual, or hitless, switching from one clock input to another. This can prevent glitches from occurring in the TX_CLK provided to the ports 204. The multiplexers 220 may also provide hitless switching. In addition, the clock synchronizer 240 may perform hitless switching when switching between received RX_CLKs from the multi-port PHY ICs 202.

Referring now to FIG. 3, a flowchart depicts exemplary steps performed in controlling the system of FIG. 2. Control begins in step 302, where a port is selected to be a source of the grandmaster clock. The selected port is assumed to be recovering the grandmaster clock from transmissions by its link partner. Control continues in step 304, where the multi-port PHY IC is configured to output the RX_CLK of that grandmaster source port.

Control continues in step 306, where the TX_CLK for that grandmaster source port is configured to be taken from the local oscillator. Control continues in step 308, where the TX_CLK for all other ports is configured to be taken from the output of the clock synchronizer. Control continues in step 310, where the clock synchronizer is configured to synchronize based on the recovered clock from the multi-port PHY IC that includes the grandmaster source port.

In various implementations, the local node may be the original source of the grandmaster clock. In this case, the grandmaster clock may be provided to the clock synchronizer from the source of the grandmaster clock. For example, this may come from an atomic clock or some other stable clock. No ports within the multi-port PHY IC will be the source of the grandmaster clock therefore. Each port will therefore transmit using the output of the clock synchronizer as the TX_CLK. The RX_CLK selected by the multiplexers will be irrelevant because the clock synchronizer is using a local grandmaster clock.

Referring now to FIGS. 4A-4B, various exemplary implementations incorporating the teachings of the present disclosure are shown. Referring now to FIG. 4A, the teachings of the disclosure can be implemented in a network interface 443 of a high definition television (HDTV) 437. The HDTV 437 includes an HDTV control module 438, a display 439, a power supply 440, memory 441, a storage device 442, the network interface 443, and an external interface 445. If the network interface 443 includes a wireless local area network interface, an antenna (not shown) may be included.

The HDTV 437 can receive input signals from the network interface 443 and/or the external interface 445, which can send and receive data via cable, broadband Internet, and/or satellite. The HDTV control module 438 may process the input signals, including encoding, decoding, filtering, and/or formatting, and generate output signals. The output signals may be communicated to one or more of the display 439, memory 441, the storage device 442, the network interface 443, and the external interface 445.

Memory 441 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 442 may include an optical storage drive, such as a DVD drive, and/or a hard disk drive (HDD). The HDTV control module 438 communicates externally via the network interface 443 and/or the external interface 445. The power supply 440 provides power to the components of the HDTV 437.

Referring now to FIG. 4B, the teachings of the disclosure can be implemented in a network interface 485 of a set top box 478. The set top box 478 includes a set top control module 480, a display 481, a power supply 482, memory 483, a storage device 484, and the network interface 485. If the network interface 485 includes a wireless local area network interface, an antenna (not shown) may be included.

The set top control module 480 may receive input signals from the network interface 485 and an external interface 487, which can send and receive data via cable, broadband Internet, and/or satellite. The set top control module 480 may process signals, including encoding, decoding, filtering, and/or formatting, and generate output signals. The output signals may include audio and/or video signals in standard and/or high definition formats. The output signals may be communicated to the network interface 485 and/or to the display 481. The display 481 may include a television, a projector, and/or a monitor.

The power supply 482 provides power to the components of the set top box 478. Memory 483 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 484 may include an optical storage drive, such as a DVD drive, and/or a hard disk drive (HDD).

Figure 4C:
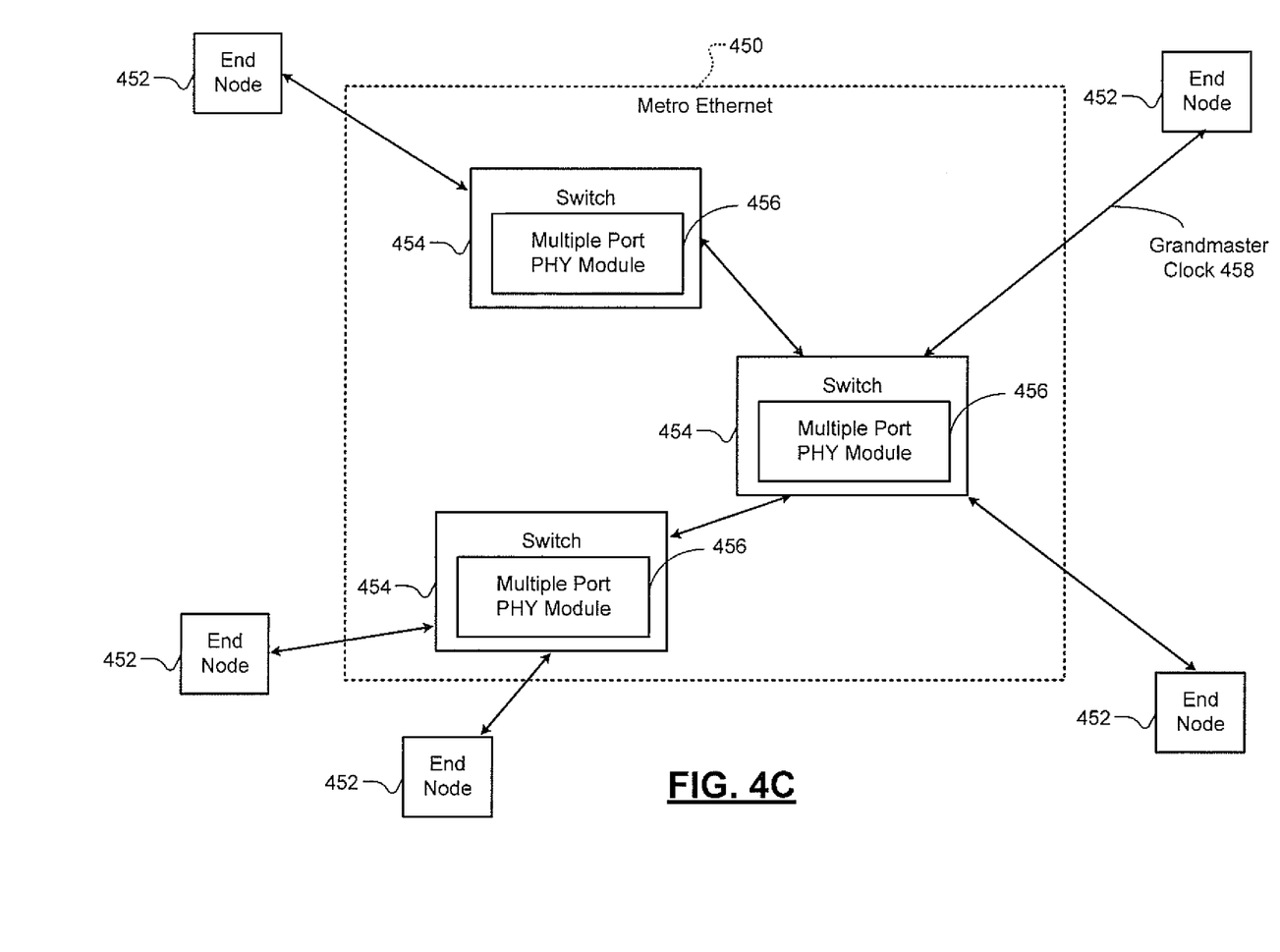
FIG. 4C is a block diagram of a Metro Ethernet network.

Referring now to FIG. 4C, the teachings of the disclosure can be implemented in a network switch (e.g., any or all of network switches 454) of a Metro Ethernet 450. Generally, a Metro Ethernet is a computer network based on the Ethernet standard and which covers a metropolitan area. A Metro Ethernet is commonly used as a metropolitan access network to connect subscribers and businesses to a Wide Area Network, such as the Internet.

In various implementations, each network switch 454 of the Metro Ethernet 450 includes a multiple port PHY module 456 (e.g., as shown in FIG. 2) to distribute a grandmaster clock 458 to other switches 454 and/or end nodes 452. The teachings of the disclosure can further be implemented in other types of networks—e.g., a synchronous Ethernet. For example, using techniques disclosed herein, some or all laboratory equipment can be synchronized to the same clock, or some or all factory floor robots can be synchronized to the same clock.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A physical layer device comprising:
a plurality of ports, wherein each port of the plurality of ports is programmable to receive a waveform of a grandmaster clock; and
a clock synchronization module configured to
  i) receive the waveform of the grandmaster clock from a first port of the plurality of ports, the first port having been programmed to receive the waveform of the grandmaster clock, and
  ii) clean up the waveform of the grandmaster clock, wherein cleaning up the waveform of the grandmaster clock includes one or more of removing jitter from the waveform of the grandmaster clock, controlling a voltage swing of the waveform of the grandmaster clock, or establishing fixed edge rates of the waveform of the grandmaster clock, and
wherein, in response to the first port being programmed to receive the waveform of the grandmaster clock, other ones of the plurality of ports are programmed to receive the waveform of the grandmaster clock, as cleaned up by the clock synchronization module, for use when transmitting data.

2. The physical layer device of claim 1, further comprising a crystal oscillator configured to generate a waveform for use by the first port of the plurality of ports when transmitting data.

3. The physical layer device of claim 1, further comprising a selection module configured to select the first port as a port to receive the waveform of the grandmaster clock.

4. The physical layer device of claim 3, wherein the selection module is configured to select the first port based on a protocol.

5. The physical layer device of claim 4, wherein the protocol comprises an IEEE 802.3 protocol.

6. A network device comprising:
the physical layer device of claim 1; and
a media access control module in communication with the physical layer device.

7. The network device of claim 6, wherein the physical layer device is in communication with a physical media.

8. The network device of claim 7, wherein the physical media comprises an optical fiber, and the physical layer device is 1000BASE-X compliant.

9. The network device of claim 7, wherein the physical media comprises twisted pairs of cable, and the physical layer device is 1000BASE-T compliant.

10. The network device of claim 6, wherein the network device comprises an Ethernet network device.

11. The physical layer device of claim 1, wherein the clock synchronization module comprises a phase-locked loop (PLL) configured to operate in response to the waveform of the grandmaster clock.

* * * * *